United States Patent [19]
Dunn et al.

[11] Patent Number: 6,112,255
[45] Date of Patent: *Aug. 29, 2000

[54] METHOD AND MEANS FOR MANAGING DISK DRIVE LEVEL LOGIC AND BUFFER MODIFIED ACCESS PATHS FOR ENHANCED RAID ARRAY DATA REBUILD AND WRITE UPDATE OPERATIONS

[75] Inventors: George Anthony Dunn; Richard Rolls; James Shipman, all of San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/969,193

[22] Filed: Nov. 13, 1997

[51] Int. Cl.$^7$ .............................. G06F 13/20; G06F 13/16
[52] U.S. Cl. ................................ 710/7; 710/52; 711/114; 711/155
[58] Field of Search .................................... 711/113, 114, 711/155; 714/6; 710/5, 7, 52

[56] References Cited

U.S. PATENT DOCUMENTS

| | | | |
|---|---|---|---|
| 3,976,982 | 8/1976 | Eiselen ........................................ | 365/96 |
| 4,092,732 | 5/1978 | Ouchi .......................................... | 714/5 |
| 4,207,609 | 6/1980 | Luiz et al. ................................. | 710/38 |
| 4,761,785 | 8/1988 | Clark et al. .............................. | 714/805 |
| 5,278,838 | 1/1994 | Ng et al. ..................................... | 714/6 |
| 5,301,297 | 4/1994 | Menon et al. ............................ | 711/114 |
| 5,574,736 | 11/1996 | Bandy ....................................... | 714/766 |
| 5,594,862 | 1/1997 | Winkler et al. ............................... | 714/5 |
| 5,737,510 | 4/1998 | Kakuta et al. ............................... | 714/6 |
| 5,745,671 | 4/1998 | Hodges ....................................... | 714/6 |

OTHER PUBLICATIONS

Patterson, "A Case for Redundant Arrays of Inexpensive Disks (RAID)", *Proceedings of the 1988 ACM SIGMOD Conference on Management of Data*, Chicago, Illinois, Jun. 1988, pp. 109–116.

Patterson et al., "Computer Organization and Design—The Hardware/Software Interface", copyright 1994 by Morgan and Kaufman Publishers, pp. 548–566.

Langdon, "Computer Design", copyright 1982 by Computeach Press, Inc., pp. 463–505.

*Primary Examiner*—Reginald G. Bragdon
*Attorney, Agent, or Firm*—Esther E. Klein; Abdy Raissinia

[57] ABSTRACT

A method and means for performing logical-combining functions such as XOR operations in a RAID 3 or 5 array or a combinational configuration of disk drives. The logical combining occurs below the device attachment interface and is used in generating new parity for write update operations and data rebuilding. Each disk drive is modified to use a segmented and address synchronized buffer in the write and read paths, and a logical circuit that combines the data in the write path before buffering with the data in the read buffer as it is read out from the buffer. The logically combined result is presented at the device read path interface. The combined data from a first disk drive interface is introduced into the write path of a second path through the second device interface and the logical combining repeated ad seriatim, the device interfaces being connectable in a daisy-chain manner and configurable by array controller commands.

12 Claims, 4 Drawing Sheets

DASD INTERNAL XOR LOGIC AND SEGMENTED BUFFERS
FOR ENHANCED READ-MODIFY-WRITE OPERATIONS

CONTROL AND DATA FLOW IN
SCSI ATTACHED DASD

FIG. 2

DASD INTERNAL XOR LOGIC AND SEGMENTED BUFFERS
FOR ENHANCED READ-MODIFY-WRITE OPERATIONS

DAISY CHAIN OF DASDs WITH INTERNAL XOR LOGIC AND
SEGMENTED BUFFERS FOR RAID 5 REBUILD AND
READ-MODIFY-WRITE OPERATIONS

FIG. 3

METHOD AND MEANS FOR MANAGING DISK DRIVE LEVEL LOGIC AND BUFFER MODIFIED ACCESS PATHS FOR ENHANCED RAID ARRAY DATA REBUILD AND WRITE UPDATE OPERATIONS

FIELD OF THE INVENTION

This invention relates to an array of disk drives operable as a RAID array of types 3 or 5 and combinations thereof, and more particularly to improvements at the disk drive level in managing selected logical and data flow processing associated with write update and data rebuild operations under fault-tolerant and fault conditions.

DESCRIPTION OF RELATED ART

Aspects of RAID Arrays and Parity

Storage capacity and fast access were the points emphasized in the storage subsystem designs from the invention of the original RAMAC magnetic data storage disk drive in 1956 until the late 1970s. However, as a larger percentage of an enterprise's data was placed on disk or tape, the effect of device or software failure was often catastrophic. Indeed, there was little hope of returning a storage subsystem to the information state it had prior to the occurrence of fault except by extraordinary means. This involved taking the subsystem offline and rewriting some or all of the data from external sources. In the 1970s, attention was directed to enhancing subsystem reliability and utilizing two or more of the attached subsystem disk drives.

Ouchi, U.S. Patent 4,092,732, "System for Recovering Data Stored in Failed Memory Unit", issued May 30, 1978, disclosed segmenting a binary data string into N data blocks, generating a redundancy $N+1^{st}$ code block (GF(2)) over the string, and writing the data and redundancy blocks out to counterpart N+1 failure-independent disk drives or DASDs. In the event of single disk drive failure, the segment of data stored on the failed drive could be recovered by accessing the remaining N−1 data disk drives and the drive storing the parity segment image and taking their modulo 2 sum. By use of a simple block parity image, Ouchi could maintain a low redundancy to data DASD ratio.

In the late 1980s, there were several efforts to extend and improve the Ouchi configuration. They sought to improve the size of a logical file which could be written to a disk storage subsystem to increase the data rate transfer between the subsystem and an accessing host, and to effectuate load balancing among accessing disks. Lastly, they sought to increase the availability of data and fault tolerance of the subsystem. If N+1 failure-independent disk drives were synchronized and concurrently accessed, then the logical track size and the effective data rate would be N times the track size and N times the data rate of a single drive. This was exemplified by the RAID 3 array of disk drives using N synchronous data drives and an $N+1^{st}$ parity drive as defined in Patterson's seminal article, "A Case for Redundant Arrays of Inexpensive Disks (RAID)", *Proceedings of the* 1988 *ACM SIGMOD Conference on Management of Data*, Chicago, Ill., June 1988, pp. 109–116.

Unfortunately, the RAID 3 drive suffered at least two problems. These included undue loading on the parity drive and low concurrency. That is, each read and write update to a file always involved the same parity drive. Also, all access requests concurrently generated at a host had to be queued against the subsystem since all the drives were simultaneously involved in responding to a single request.

Clark et al., U.S. Pat. No. 4,761,785, "Parity Spreading to Enhance Storage Access", issued Aug. 2, 1988, disclosed a modification to the Ouchi '732 patent by spreading parity-encoded blocks over a plurality of DASDs and for asynchronously accessing the disk drives. This parity block spreading reduces load imbalance for write update, as well as operation in the degraded mode. Relatedly, Clark pointed out that the parity spreading did not necessarily have to be uniformly distributed across all attached DASDs. Both parity spreading and asynchronous access of the disk drives in an array define the RAID 5 array (see above-cited Patterson article).

In Clark, N disk drives in an array are divided into a multiple of equally-sized address blocks, each containing a plurality of records. Blocks from each storage unit residing in the same address ranges form a stripe of blocks. Each stripe has a block on one of the disk drives containing a parity block image for the remaining blocks of the stripe. Further, stripes also have parity blocks that are distributed on different drives. It follows that every time a record is modified, parity image associated with the stripe must be altered.

As discussed in Patterson, RAID 5 configurations support short writes. That is, they permit accessing no more than two out of N disk drives for an update write of a block. Since the parity blocks are spread out among the drives, then all writes are not queued against the drive having two or more parity blocks for different stripes. Significantly, Clark further called attention to the fact that a write and parity update need not require access to all the blocks of a stripe.

The Write Update and Rebuild Problem

In the post-Patterson and Clark era, the IBM 9394 RAID 5 disk drive array includes a control unit and a plurality of drives which is illustrative of the state of the art. The array control unit itself comprises one or more processors, a cache and buffer, and interfaces to both a host and to the drives. The array controller would interpret read or write accessing requests from the host CPU and send appropriate commands to the drives. A read request would be interpreted by sending a read command and address argument to the drive or drives and copying the data into the array cache for further staging. On the other hand, each write update operation involves (a) reading one or more records from DASD into the subsystem buffer/cache, (b) logically combining or replacing some portion of the record with the update received from the host, and (c) writing one or more modified records out to the DASD as a track overwrite. Most schemes presuppose an update in place. That is, the modified record replaces the original at the same DASD location.

From an operational view, Clark and others point out that each write modification involves four disk drive accessing operations (read old data block, read old parity block, write new data block, write new parity block), in addition to computing the new parity. The parity update P is logically expressed as the modulo 2 sum P (new parity block)=old data block+ new data block+ old parity block. Unfortunately, the data movements and operations all occur within the confines of the array control unit or the like. This reduces the effective data rate and concurrency of the array subsystem to and from the accessing CPUs, and to and from the drives and the array controller. First, the processors in the array control unit must dedicate MIPs to manage the staging of data not available in the array cache from the DASDs. Second, there exists delay or latency in the actual access and movement of data from the disk track to the array cache for both read operations. This is incurred again when the new data and new parity blocks are written out to the disk. Third, the parity calculation involves modulo 2 addition. This is a binary operation involving two operands at a time. This means that only two operands at a time can be combined. Thus, at least two addition cycles are required, notwithstanding the fact that there exist no more than three operands.

In the event of a disk drive failure, an array controller must still process read and write requests. The problem is more complex to resolve since data must first be reconstructed and then staged to the requesting host. If possible, the reconstructed file, block, or record is also used to rebuild data on a hot spare disk drive. Indeed, Ng et al. aptly describe the scheduling difficulties in U.S. Pat. No. 5,278,838, "Recovery from Errors in a Redundant Array of Disk Drives", issued Jan. 11, 1994.

In each case, the read-modify-write operation and the rebuild operations or both require execution of logical binary operations upon operands on the fly at a point in the storage subsystem control and data flow that substantially effects data rate, concurrency, and availability. The most common logical binary operation is that of modulo 2 addition or exclusive OR'ing (abbreviated as XOR). This is for the purpose of computing new parity.

Hierarchical Level of Execution of a Logical Combining Function in a Storage Subsystem Relatedly, the most common point of execution of XOR'ing occurs either at a host CPU directly attaching disk drives as described in the Clark patent or at a special purpose processor coacting with the array controller cache and microprocessor as set out by Winkler et al., U.S. Pat. No. 5,594,862, "XOR Controller for a Storage Subsystem", issued Jan. 14, 1997, or by combining partial sums in an efficient manner over a plurality of drives below the device attachment interface as taught by Bandy, U.S. Pat. No. 5,574,736, "Data Storage Device and Method of Operation", issued Nov. 12, 1996.

The Winkler patent uses the array control unit cache as the repository for new data from the host and old data and old parity staged from the drives. Address pointers are recorded as the elements are written into cache. A pointer-driven special purpose processor (XOR 23) accesses the cache and logically combines the elements to form the new parity.

The Bandy patent discloses an arrangement (FIGS. 2, 3A) for computing a new parity responsive to a write update command below the device attachment (SCSI) interface. This is accomplished by combining old data and new data at a first disk drive and sending the partial sum to a parity drive, where the old parity is then combined with the partial sum to yield the new parity. More particularly, Bandy reads the old data (119) from a first disk drive (27), places it in a disk drive buffer (21) at a first address (123), writes new data (113) into the buffer at a second address (117), XOR's (31) the new data and the old data from the first and second addresses, and writes the partial sum (termed "syndrome") into a third buffer address (129). The partial sum or syndrome is then sent to a dedicated parity drive where the combining process is repeated with respect to the partial sum and the old parity.

SUMMARY OF THE INVENTION

It is accordingly an object of this invention to devise a method and means for logically combining selected blocks in datastreams being written to an array of disk drives on the fly below the device attachment interface with minimal logic and buffering in the flow paths.

It is a related object that the method and means provide for the generation of modulo 2 sums on the fly responsive to commands from the array controller, but below the device attachment interface in a pipeline processing manner.

It is yet another object that the method and means be directed to improvements in the RAID 3–5 attachment of an array of disk drives and to be responsive to array controller commands. These commands relate to selected information stored on the disk drives and are either updated or modified, or parity generated. In the event of disk drive unavailability, the array controller must provide for the rebuilding of selected information from the remaining disk drives in the array utilizing the logical combining operations on the fly.

It is therefore a related object that the method and means provide that critical new parity and data rebuilding operations should occur below the device attachment interface in a pipeline processing manner.

The above objects are believed satisfied by an arrangement having a plurality of storage devices and an interface logic for accessing the devices and passing commands and data between the devices and an external source. Each storage device comprises a cyclic, tracked storage medium such as a rotating magnetic disk; a head/disk/arm assembly (HDA) for accessing the disk; a buffer having first and second addressable segments; a copy-back path for reading data blocks from the disk to a device interface through the buffer; and a recording path for moving blocks received from the interface also through the buffer and writing them out on the disk.

More particularly, the copy-back path including the HDA stages a block of old data recorded at a predetermined track address on the disk to a location in the first buffer segment, and subsequently stages the old data block to the device interface. Likewise, a recording path also including the HDA writes a block of modified data received from the device interface to a mirror location in the second buffer segment, and subsequently writes the modified data block to the predetermined track address on the disk.

Significantly, the disk drive has been altered so that the block of modified data being written into address x in one segment of the buffer is logically combined with a second block of older data being read out from a mirror address of x in the second segment of the buffer. The combined block is then made available in the copy-back path at the device interface. The block of modified data just written into the buffer can be subsequently written out to the same disk address as the block of older data staged to the buffer segment in the copy-back path. The combined block can be gated over into the recording path of another disk drive through the device interfaces and similarly processed. The second or other disk drive would typically store the parity block of a redundancy group.

The resident device processor and the logic combining circuit are responsive to external commands such as a read-modify-write and any associated access commands. The commands are received through the device interface and are interpreted by the device processor to operatively invoke the copy-back and recording paths. Structurally, the segmented buffer with mirrored addresses in combination with the logic combining circuit in the paths ensures concurrency. That is, the block of modified data can be written into a location in the second buffer segment in the recording path, while the block of older data can be read from disk and staged into a mirror location in the first buffer segment in the copy-back path.

Contemporaneously, a copy of the modified data block is logically combined (XOR'ed) with the old data block as the modified data is being written into the buffer and the older data is being read from the buffer. The logically combined block is therefore immediately available at the device interface in the copy-back path. If the combined block is communicated in a daisy chain manner through device interfaces from the copy-back path of a first device to the recording path of a second device and repeated ad seriatim, then a new parity block in a redundancy group can be processed. Furthermore, this processing associated with any write update of one or more data blocks occurs below the device attachment interface.

Advantageously, the method and means of this invention reduce the number of components involved in using XOR functions for RAID 5 array rebuild and update write operations by reducing the number of buffers. The invention in effect transfers the XOR function from an array control function to a drive-level function, thus increasing array MIP rate. Lastly, the method and means of the invention perform the operation on the fly in contrast with the four access operations in the prior art.

DESCRIPTION OF THE PREFERRED EMBODIMENT

Figure 1A:
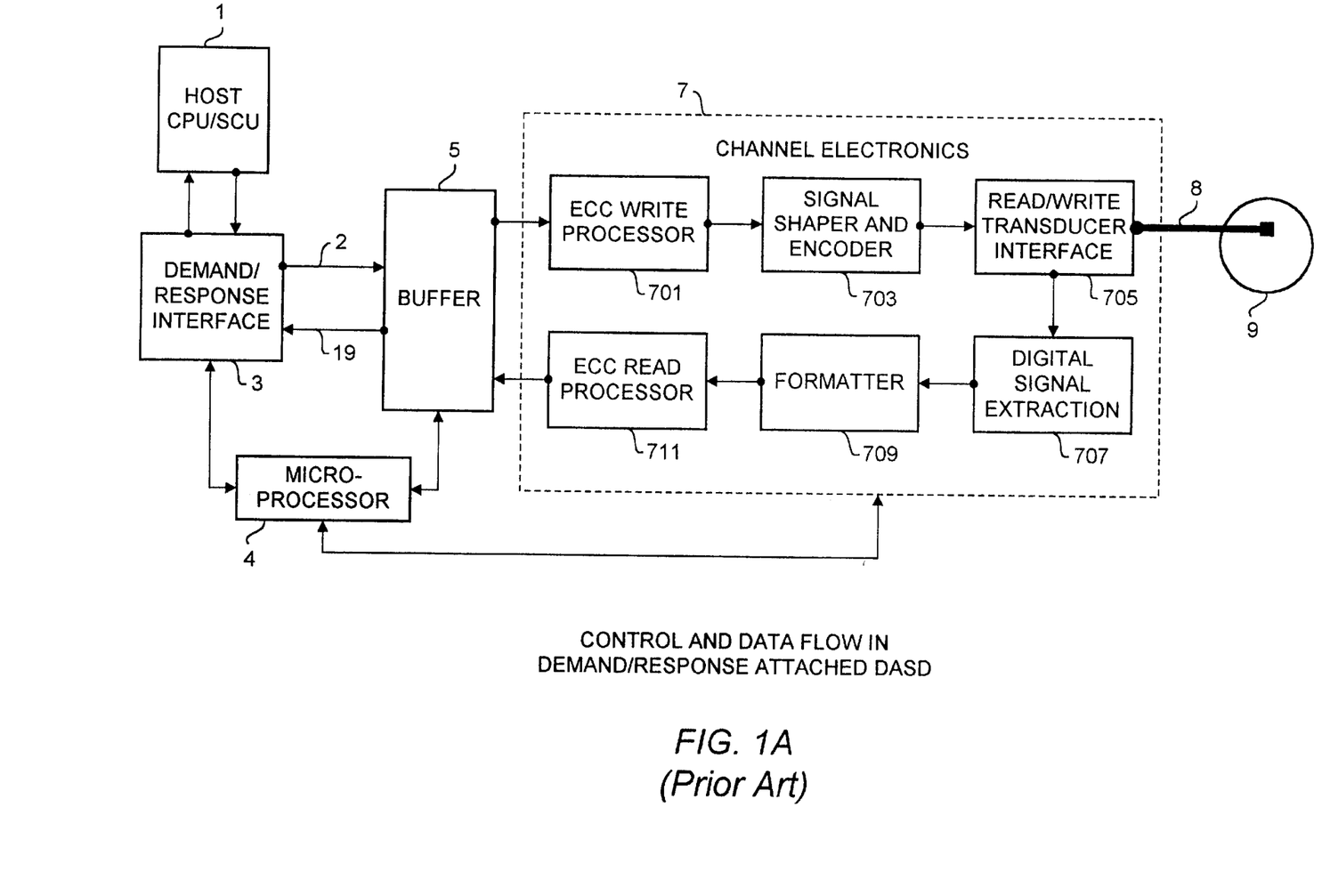
FIG. 1A depicts control and data flow in a prior art disk drive or DASD attached across a demand/response interface and exhibiting the drive channel electronics portion of the read and write paths.

Referring now to FIG. 1A, there is depicted control and data flow in a prior art disk drive or DASD attached across a demand/response interface 3 and exhibiting the drive channel electronics portion of the read and write paths. A host or CPU 1, such as an IBM System 370 or 390 or other mainframe computer running under an MVS operating system or the like, sends commands and data in the form of read and write requests to an attached storage subsystem. A description of the architecture and that of the attached storage subsystem may be found in Luiz, U.S. Pat. No. 4,207,609, "Method and Means for Path Independent Device Reservation and Reconnection in a Multi-CPU and Shared Device Access System", issued Jun. 10, 1980.

Significantly, such systems and attached subsystems were of the hierarchical and demand/responsive type. That is, an application running on the CPU would initiate read and write calls to the operating system. These calls, in turn, were passed to an input/output processor or its virtual equivalent (called a channel) within the CPU. The read or write requests and related accessing information would be passed to an external storage subsystem. The subsystem would responsively give only status (availability, completion, and fault) and pass the requested data to or from the CPU.

Referring again to FIG. 1A, the storage control unit (SCU) typified by an IBM 3990 was responsive to both read and write access requests from the host. The SCU would have to convert the logical address of the desired data in each request into either a real cache or disk drive address. That is, in response to a read request, it would ascertain whether the requested data could be staged to the CPU out of a local SCU cache. If not, the read request, the accessing commands, and the disk address would then be passed down to one of the attached disk drives. A write request differed only in that the data movement would be from the host to the disk.

Each disk drive, such as an IBM 3390, was attached to the SCU by a demand/response interface 3 over a multidrop line with parallel control, addressing, and data paths. The term "demand/response" connotes that a new request will not be accepted from a higher echelon until the last request is satisfied by a lower echelon, and a positive indication is made by the lower to the higher echelon. This interface was designed at a time when the cost of buffering was high and it interlocked the data rate of the higher elements to that of the device.

Typically, the SCU 1 would send a series of access commands and addresses to a device via a multidrop line (not shown). A device processor 4, upon the commands being transferred across the interface, would interpret the commands and addresses. The processor 4 would cause the HDA to access the data from the disk 9 over a copy-back path including channel electronics 7 to buffer 5 and from buffer 5 through the interface 3 to the SCU 1. The copy-back path comprised a transducer 705, a digital signal extractor 707, a formatter 709, and an ECC read processor 711.

The transducer 705 would convert time-sensed fluctuating magnetic fields into time-varying electrical waveforms. The signal extractor 707 produced a binary digital stream from the electrical waveforms. Next, the formatter 709 accumulated the binary digits in bytes and words. Lastly, the ECC processor 711 detected and corrected on the fly any bytes in error or erasure before staging the corrected stream into the device buffer 5. Usually, the device buffer 5 could be implemented either as a double buffer or circular buffer to permit coincident reading and writing of data to and from the interface 3.

In a similar fashion, digital binary data under a write command would be moved from the device buffer 5 through an ECC processor 701, and mapped into codewords of a linear cyclic error correction code. The signals would then be shaped and written out through circuits 703 and 705 and recorded on an addressed disk track.

Referring again to FIG. 1A, it is the case that a device processor 4 interprets the commands and address upon being transferred across the interface 3.The processor 4 is the local control element and dispatches arms to access any data. It also activates and monitors the appropriate elements in either the copy-back or write paths to ensure a streaming to or from the buffer 5 in the SCU direction responsive to a read command, or in the disk direction responsive to a write command in a manner well understood in the art.

Figure 1B:
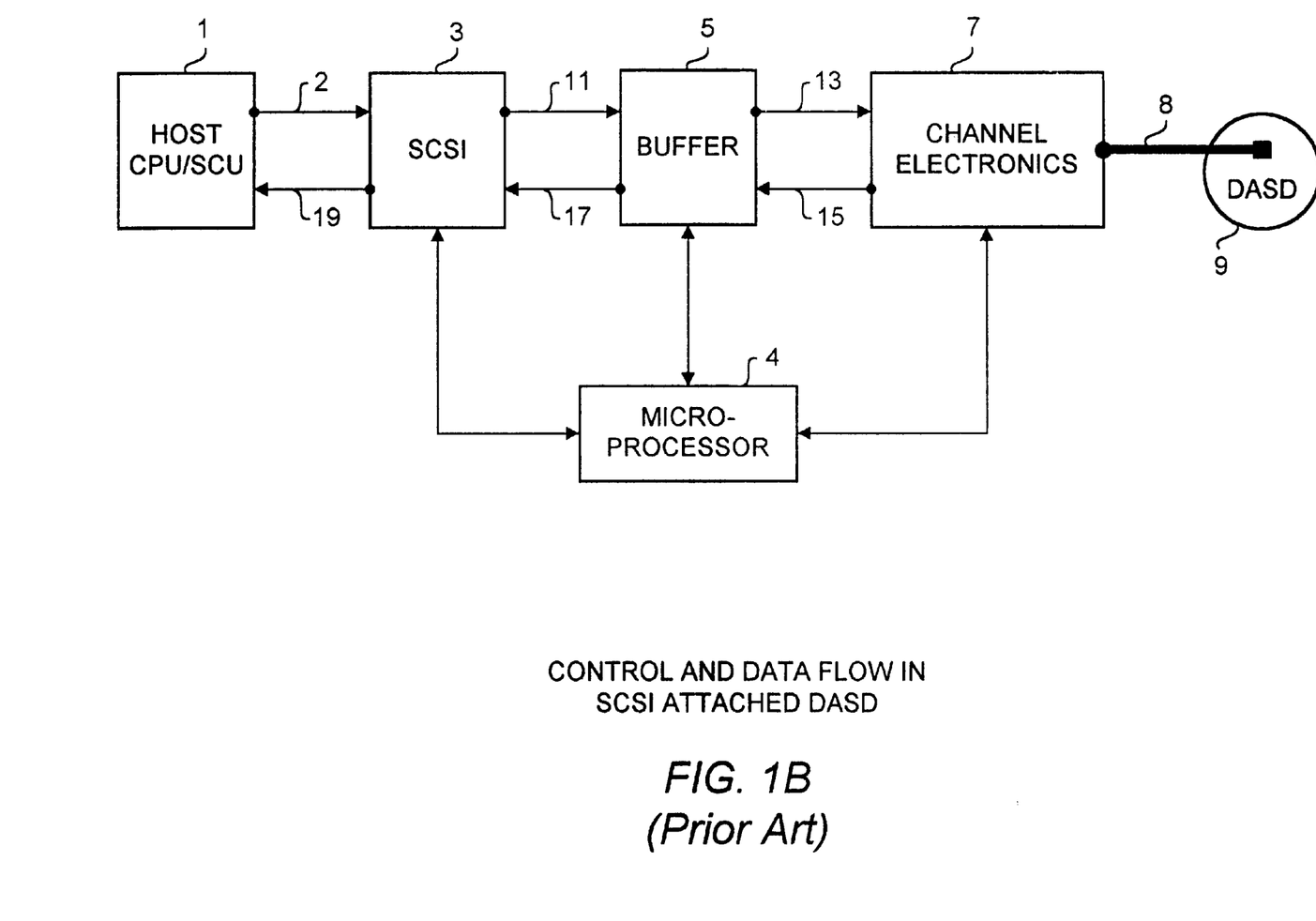
FIG. 1B shows the same control and data flow in a prior art disk drive attached across an SCSI interface.

Referring now to FIG. 1B, there is depicted the same system as that shown in FIG. 1A, but for the SCSI interface 3 and the focus on the data paths 13 and 15 coupling the buffer 5 to the channel electronics 7 and the paths 15 and 17 connecting the SCSI device interface 3. More recently, storage subsystems have become heavily buffered at the array or subsystem controller level and coupling disciplines such as SCSI have been used to take advantage of the looser coupling in the hierarchy of elements between an SCU and the disk storage medium. In recent years, it has been usual to couple a plurality of disk drives over a time division, multiplexed bus under SCSI discipline not only to accommodate varying data rates but to permit sending groups of commands to the disk drives for their asynchronous execution.

Figure 2:
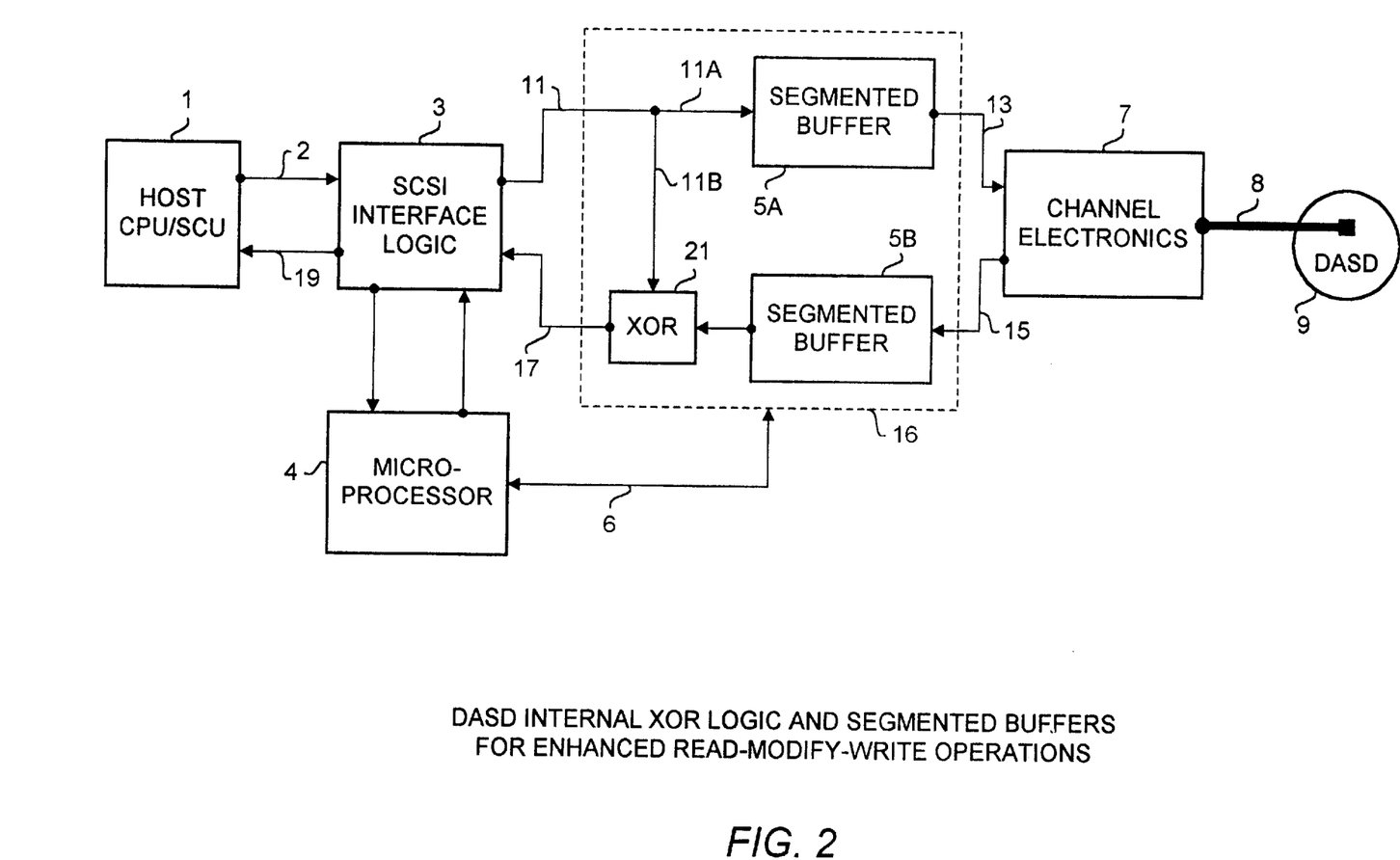
FIG. 2 sets out the modified DASD internal XOR logic and segmented buffers according to the invention for enhanced read-modify-write operations.
Figure 3:
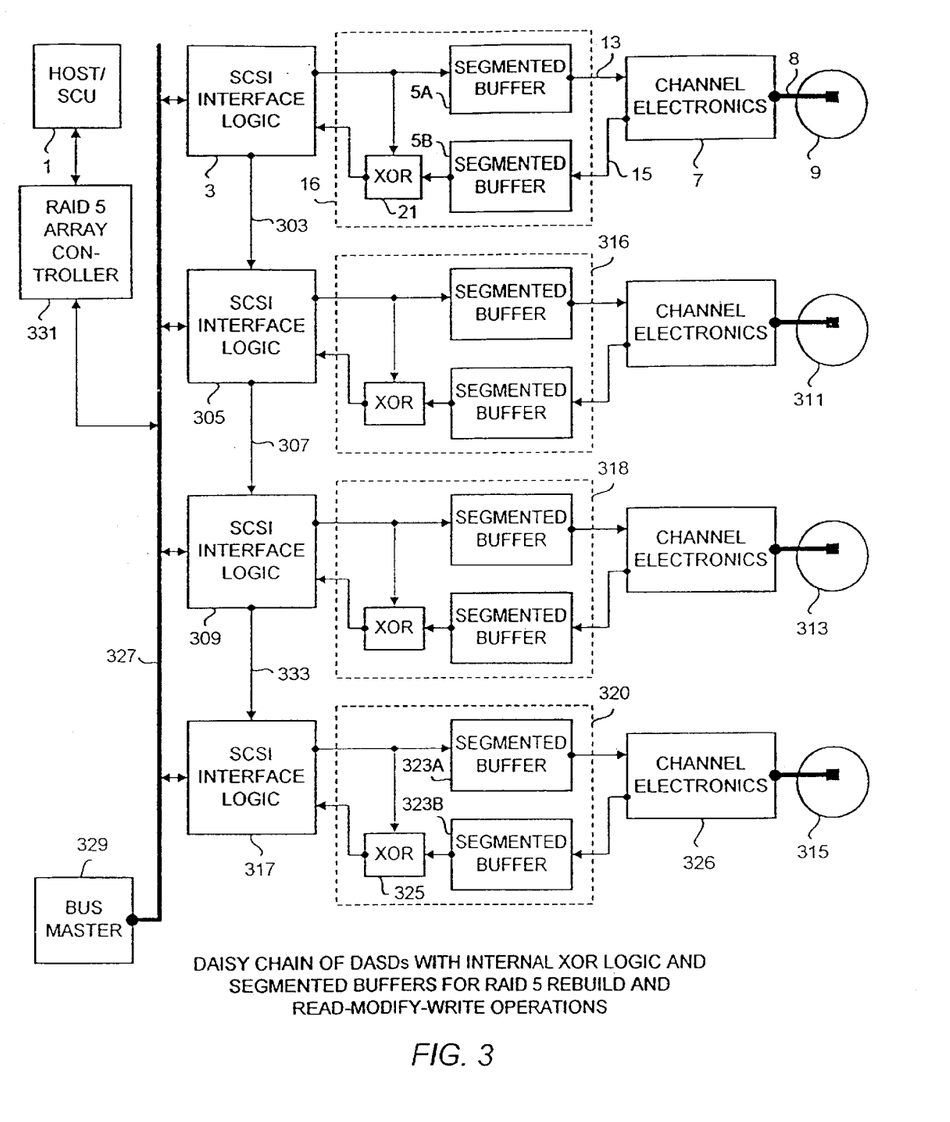
FIG. 3 illustrates an array of DASDs modified according to the invention and daisy chained to effectuate array operations involving the logical combining of datastreams to and from the devices occurring below the device attachment interface.

Referring now to FIG. 2, there is set out the modified DASD internal XOR logic and segmented buffers according to the invention for enhanced read-modify-write operations and data rebuild operations. Each disk drive is being modified according to the invention so that any plurality of the drives as shown in FIG. 3 may effectuate the write update and the parity recalculation below the device attachment interface.

In FIG. 2, the drive has been modified by substituting a segmented buffer 5A and 5B for the double or circular buffer 5 in FIGS. 1A and 1B. Also, a logic-combining circuit exemplified by XOR gate 21 has been inserted between the buffer and the SCSI interface 3.The inputs to gate 21 include the SCSI interface output 11 over path 11b and the output of buffer segment 5B. The gate 21 output drives interface 3 on path 17.

Operationally, a read-modify-write command or its equivalents is applied to the device through interface logic 3 and is interpreted by processor 4. First, the processor drives the servo loop (not shown) to access the old data block on the disk at disk track address y. Once accessed on the disk 9, the old data block is staged up through a copy-back path including channel electronics 7, and written into a location x in the buffer segment 5B over path 15. Next, the processor causes the modified data block to pass through the interface logic 3 and writes into a location x' in the buffer segment 5A over paths 11 and 11A. In this regard, the buffer segment location register addresses are the same for both the old and new data blocks.

Significantly, at the moment, the processor 4 causes the modified block to be written into the buffer segment 5A, and a copy of the modified block is also applied as one input to logic gate 21. At the same time, the processor causes the old data block to be read out of the buffer segment 5B and applied as an input to logic gate 21 as a second input. The logically combined block of old data XOR new data is available at the device interface. At any time subsequent, the modified block can be written out to the disk at the same disk track address y from which the old block was staged.

One of the points to be observed is that the logic gate need not be limited to the exclusive OR function. Indeed, any number of other logic-combining functions can be substituted such as logical "OR", logical AND, replace, extract, set to zero, and set to one, and further wherein the first and second blocks include fixed-length binary strings. Reference is made to Eiselen, U.S. Pat. NO. 3,976,982, "Apparatus for Image Manipulation", issued Aug. 24, 1976, showing a logic-combining circuit in which an external bitstream was combined with a selected raster-scanned bitstream from a bit-mapped memory for electronic cut and paste purposes.

Referring now to FIG. 3, there is illustrated an array of DASDs modified according to the invention and daisy current RAID 5 disk array storage subsystems. The array controller 331 is coupled to a plurality of disk storage devices 9,311,313, and 315 across an SCSI bus 327, whose access discipline is governed by a bus master 329. Typically, the bus is a time-slotted and multiplex pathway supporting the transfer of commands, addresses, and data bilaterally. Bus access disciplines and their design tradeoffs are exhaustively described in Patterson et al., "Computer Organization and Design—The Hardware/Software Interface", copyright 1994 by Morgan and Kaufman Publishers, pp. 548–566.

Each disk drive 9,311,313, and 315 is coupled to the bus 327 through counterpart device SCSI interface logic arrangements 3,305,309, and 317. Also, each interface logic arrangement is selectively daisy chain coupled below the bus-coupled interface. That is, logic 3 couples logic 305 over path 303. Similarly, logic 305 couples logic 309 over path 307, while logic 309 couples logic 317 over path 333. The daisy chain is set up by the array controller via commands sent over the bus 327 selectively addressing only those disk drives involved in a write modification. For instance, if disk drive 9 stored a data block in a redundancy group whose parity block was stored on disk drive 313, then the array would activate a pathway from logic 3 through and including logic 309 over paths 303 and 307. In this situation, logic 305 acts merely as a passive conduit between paths 303 and 307. In this regard, the design of combinational logic to select among passive path support for conducting a block of data and steering a block addressed to the disk device to which it interfaces is believed well appreciated in the art. To this extent, the skilled artisan is referred to Langdon, "Computer Design", copyright 1982 by Computeach Press, Inc., pp. 463–505, or equivalent texts.

In FIG. 3, the RAID 5 array controller 331 currently writes a predetermined amount of data block, page, track, or volume in each of N drives of a plurality of drives and writes the parity image of that association of blocks into another N+1$^{st}$ drive in the manner or pattern similar to that described in the Clark patent supra. For purposes of a simple example and making reference to the Clark patent, suppose that the same range of physical tracks on a given cylinder is reserved across each of three disk drives 9,311, and 313. The fourth drive 315 is being held in reserve as a hot spare.

Further, assume that the unit of writable storage in each of these reserved areas is a block. Thus, the array would write out to two of the disks two data blocks and a parity image block to a third disk. As presented in the following table, each row entry represents a redundancy or parity group. There are several features to note. These are that no single disk drive stores more than one block from the same redundancy group, and no disk drive stores all of the parity blocks from all of the groups.

| Stripe | Disk Drive 9 | Disk Drive 311 | Disk Drive 313 | Disk Drive 315 |
|---|---|---|---|---|
| 1 | Data Block A1 | Data Block A2 | Parity Image $A_p$ | Spare Space |
| 2 | Parity Image $B_p$ | Data Block B1 | Data Block B2 | Spare Space |
| 3 | Data Block C1 | Parity Image $C_p$ | Data Block C2 | Spare Space |
| 4 | Data Block D1 | Data Block D2 | Parity Image $D_p$ | Spare Space |
| 5 | Parity Image E | Data Block E1 | Data Block E2 | Spare Space | chained to effectuate RAID 5 array operations involving the logical combining of datastreams to and from the devices occurring below the device attachment interface. The host CPU or IBM 3990 SCU 1 transmits an access request to a RAID 5 array controller 331. An IBM RAMAC exemplifies Suppose that the array is in the process of executing a write update operation on data block D2, the primed blocks such as B' designating changed or modified blocks. In the prior art, this would mean staging block D2 from drive 311 and parity block $D_p$ from drive 313 to the array controller 331 through bus 327 and the interface logic 305 and 309. At this point, the controller 311 would compute the new parity $D_p'=(D2+D2'+D_p)$ modulo 2. The modified data block D2' and the new parity $D_p'$ would then be written out through the counterpart recording paths to disks 311 and 313 for recording in place.

In the embodiment of this invention in FIG. 3, in order to write update data block D2, the array controller sends out the read-modify-write command sequence to SCSI disk drives 311 and 313. The processor 4 (not shown) for each of the drives 311 and 313 asynchronously stages blocks D2 and $D_p$ read from a track address y and written into location x in the buffer segment 5B of their respective copy-back paths contained within the dotted line elements 316 and 318. When controller 331 provides the modified data block D2' to interface 305, device processor 4 causes D2' to be written into the mirror location x of the buffer segment 5A in the recording path of drive 311 and concurrently applied as an input to the XOR gate. At the same time, the contents of location x in the other buffer segment are read out and applied as a second input to the logic gate. The logically combined or XOR result (D2'+D2) modulo 2 is applied to the device interface 305 in the copy-back path.

At this point, device interface 305 daisy chains the logical sum (D2'+D2) as an input to the recording path of disk drive 313. The device processor for drive 313 concurrently applies this sum as one input to the XOR logic gate, and reads out the old parity $D_p$ from the buffer segment in the copy-back path of drive 313. The processor then causes the interface logic 309 to switchably connect and feed back the logical summed output $D_p'=[(D2'+D2)+D_p]$ modulo 2 from the copy-back path into the record path and then write through the new parity $D_p'$ in place on the disk of drive 313.

The computation of the new parity is order independent. However, the disk drive storing the parity must be the last in recording order. This can be managed when controller 331 accesses the storage map of the redundancy groups distributed on array drives, the parity drive is noted, and the ripple sequence for the daisy chain of interface logic merely endmarks the parity drive as the last drive in the ripple chain.

It is noted from FIG. 3 and the above table that disk drive 315 has been reserved as a hot spare. What this means is that the drive is always available as a substitute in the event that any one of the other drives fails. The spare may be reconstructed by writing to it opportunistically or on a scheduled basis. In either event, the replacement blocks may be formed under the attachment interface in a manner consonant with the read-modify-write command execution. It should be understood that such replacement means that the array is operating in a fault-degraded mode. That is, whether the block to be written on the hot spare 315 is either a data block or a parity block, the drive 315 must be the last drive in the ripple chain. This devolves from (1) the fact that it must write out the logical sum modulo 2 of the accesses to the same stripe across N−1 of the remaining drives, and (2) the recirculation of the last logical sum from the logic gate 325 in the copy-back path in dotted line element 320 of drive 315 through the interface logic 317 into the recording path as described previously.

Extensions

One extension of the invention is that concurrent accessing of different and mutually exclusive sets of the plurality of RAID 5 array disk drives to read and write modify different redundancy groups stored in the respective mutually exclusive sets. In this context, the invention would be operable by endmarking and managing mutually exclusive daisy chains of interface logic arrangements. This accommodates an increased throughput of different tasks important to RAID 5 array applications and manages the parity modifications under the device attachment interface.

This invention can also be adapted so as to operate underneath a logical device attachment interface as where RAID arrays have been configured to combine several types in a layered arrangement formed from a RAID 5 array of RAID 3 disk drive arrays. Such a hybrid array is illustrated in Menon et al., U.S. Pat. No. 5,301,297, "Method and Means for Managing RAID 5 DASD Arrays Having RAID DASD Arrays as Logical Devices Thereof", issued Apr. 5, 1994. These hybrid configurations have been informally denoted as RAID 6 or RAID 9, etc.

In a hybrid configuration such as that depicted in the Menon patent, each of the RAID 3 arrays operates as a logical disk drive. Thus, if the logical devices were "daisy chained" in the manner of FIG. 3, then the XOR operations for forming a new parity during a write update or reconstructing data during rebuild could be executed below the logical device attachment. Otherwise, the invention could be used below the bus device attachment of the RAID 3 level as previously discussed.

The technology of the attachment interface should be transparent to the method and means of the invention. Indeed, the architecture of the coupling between the controller and the DASD devices forming the array can be one selected from a set consisting of demand/response, various SCSI mastered and arbitrated bus disciplines, fiber demand arbitrated loop (FCAL), and serial storage attachment (SSA) disciplines.

Another extension to the method and means of this invention is to execute logical combining for a variety of storage management conditions, in addition to use of the XOR function in the generation of new parity for the write updating of redundancy groups stored on RAID 5 arrays. The use of the extension functions can operate to perform storage edit functions, such as the elision or erasure of duplicate blocks or redundancy groups, or the insertion of different or substitute blocks in the redundancy groups on the fly and below the attachment interface.

The invention has been described with respect to an illustrative embodiment thereof, and it will be understood that various changes may be made in the method and means herein described without departing from the scope and teaching of the invention. Accordingly, the described embodiment is to be considered merely exemplary and the invention is not to be limited except as specified in the attached claims.

What is claimed is:

1. A storage device comprising a cyclic, tracked storage medium (9); means for accessing said medium (7,8); said device further comprising:

a buffer having first and second addressable segments, wherein mirror locations in said addressable segments share the same address;

a copy-back path (8,7,15) including said accessing means for staging a first block recorded at a predetermined track address on the storage medium to a location in the first buffer segment (5B) and subsequently for staging (17,3,19) the first block to a device interface (3);

a recording path (2,3,11) also including said accessing means for writing a second block received from the device interface to a mirror location in the second buffer segment (5A) corresponding to the location in the first buffer segment, and subsequently for writing (13,7,8) said second block to the predetermined track address on the storage medium; and means (4,6,11,21) responsive to external commands received through the device interface (3) for operatively invoking said copy-back and recording paths, for logically combining a copy of the second block as it is being written to the location in the second buffer segment with the first block as it is concurrently being read from the mirrored location in the first buffer segment, and for rendering said logically combined block available at the device interface (3) in the copy-back path.

2. The storage device according to claim 1, wherein the logical-combining means (21) is one selected from a set consisting of logical "OR", exclusive "OR", logical AND, replace, extract, set to zero, and set to one; and further wherein the first and second blocks include fixed-length binary strings.

3. The storage device according to claim 1, wherein said means responsive to external commands include a processor (4) having control program means for interpreting said external commands; for establishing said copy-back and recording paths and the movement, storage, and extraction of blocks from the buffer segments; and for logically combining a copy of the second block with the first block on the fly as the first block is staged from the buffer and the second block is written in the buffer at mirrored locations in respective buffer segments.

4. The storage device according to claim 1, wherein the external command includes a read-modify-write command.

5. An arrangement having a plurality of storage devices and an interface logic for accessing the devices and passing commands and data between the devices and an external source, each storage device comprising:

a cyclic, tracked storage medium; means for accessing said medium; a buffer having first and second addressable segments;

a copy-back path including said accessing means for staging a first block recorded at a predetermined track address on the storage medium to a location in the first buffer segment and subsequently for staging the first block to a device interface;

a recording path also including said accessing means for writing a second block received from the device interface to a mirror location in the second buffer segment and subsequently for writing said second block to the predetermined track address on the storage medium, said location in the first buffer segment and said mirror location having the same address; and means responsive to external commands received through the device interface for operatively invoking said copy-back and recording paths, for logically combining a copy of the second block as it is being written to the location in the second buffer segment with the first block as it is concurrently being read from the mirrored location in the first buffer segment and for rendering said logically combined block available at the device interface in the copy-back path;

said interface logic including means for daisy chain communicating the combined block through the device interfaces from the copy-back path of a first device to the recording path of a second device.

6. The arrangement according to claim 5, wherein:

N blocks of data are recorded on counterpart ones of N devices of said plurality, and further wherein a parity image of said N blocks is recorded on an N+1$^{st}$ device, N blocks and their parity image constituting a group, said devices having the capacity for storing a plurality of groups, said groups being distributed such that no single device has more than one block from any one group recorded thereon, said groups being further distributed such that no single device has recorded all the parity images of the plurality of groups, and further wherein the drives defining the daisy chain are selected from among those drives storing blocks from within the same group and including the device storing the parity image.

7. The arrangement according to claim 5, wherein the logic-combining means is one selected from a set consisting of logical "OR", exclusive "OR", logical AND, replace, extract, set to zero, and set to one, and further wherein the first and second blocks include fixed-length binary strings.

8. The arrangement according to claim 5, wherein:

the logic-combining means in each device comprises an exclusive OR gate, and further wherein the first and second blocks comprise fixed-length binary strings, and still further wherein the external commands include a write update command, said interface logic including the device interfaces such that the write update command being applied to at least two of the devices.

9. The arrangement according to claim 5, wherein the interface logic includes means coupling the device interfaces selected from a set of device attachment and usage disciplines consisting of demand/response, SCSI, fiber channel arbitrated loop, and serial storage attachment architecture.

10. A method of managing a configuration of disk drives and an attached array controller, said drives storing redundancy groups, each group including N data blocks and a simple parity image block thereof, each disk drive having a cyclic, tracked storage medium, means for accessing the medium, a buffer having first and second addressable segments, wherein mirror locations in said first and second segments having the same address, a copy-back path including the accessing means coupling the medium to a device interface through the buffer, a recording path including the accessing means for coupling the device interface to the medium through the buffer, and means for communicatively coupling the device interfaces and the controller, said configuration of disk drives and controller being responsive to commands specifying write modification of M of N data blocks and the parity block in the same redundancy group, said method comprising:

at each of M+1 disk drives counterpart to the M of N modified data blocks and a M+1st parity block drive the steps of:

(a) staging a first block recorded at a predetermined track address on the storage medium to a location in the first buffer segment and subsequently staging the first block to the device interface;

(b) writing a second block received from the device interface to a mirror location in the second buffer segment corresponding to the location in the first buffer segment and subsequently writing said second block to the predetermined track address on the storage medium;

(c) operatively invoking said copy-back and recording paths responsive to external commands received through the device interface; and (c1) contemporaneously writing the second block into the mirror location in the second buffer segment logically and reading the first block from the location in the first buffer segment, (c2) logically combining a copy of the second block as it is being written with the first block as it is being read, and rendering said logically combined block available at the device interface in the copy-back path;

at the means for communicatively coupling among the devices:

(d) daisy chain communicating the combined block through the device interfaces from the copy-back path of a first of the M disk drives to the recording path of the second of the M disk drives and repeating ad seriatim until the M+1st device writes the logical combined sum of M+1 sums through to its storage medium.

11. The method according to claim 10, wherein M+1 disk drives include at least two disk drives, further wherein the first and second blocks are binary strings, still further wherein the logical-combining step (c2) includes the step of adding the first and second blocks modulo 2.

12. The method according to claim 10, wherein the redundancy groups are distributed across the drives such that no single drive stores two or more blocks from the same group, and no single drive stores the parity image blocks for all the groups.

* * * * *